United States Patent
Balliet et al.

(10) Patent No.: US 7,147,945 B2
(45) Date of Patent: *Dec. 12, 2006

(54) SYSTEM FOR DETERMINING A GAS COMPOSITION WITHIN A SHUT DOWN FUEL CELL POWER PLANT AND METHOD OF OPERATION

(75) Inventors: Ryan J. Balliet, West Hartford, CT (US); Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 590 days.

This patent is subject to a terminal disclaimer.

(21) Appl. No.: 10/244,495

(22) Filed: Sep. 16, 2002

(65) Prior Publication Data

US 2004/0053089 A1 Mar. 18, 2004

(51) Int. Cl.
*H01M 8/00* (2006.01)
*H01M 8/04* (2006.01)
*H01M 10/44* (2006.01)
*H01M 2/00* (2006.01)
*G01N 21/00* (2006.01)

(52) U.S. Cl. .............................. 429/12; 429/13; 429/22; 429/50; 429/61; 429/64; 422/83; 422/98; 73/1.01; 73/1.02; 73/23.2

(58) Field of Classification Search .................. 429/12, 429/13, 22, 50, 61, 64; 422/83, 98; 73/1.01, 73/1.02, 23.2
See application file for complete search history.

(56) References Cited

U.S. PATENT DOCUMENTS

| 5,013,617 | A | | 5/1991 | Scheffler |
|---|---|---|---|---|
| 5,045,414 | A | | 9/1991 | Bushnell et al. |
| 5,170,124 | A | * | 12/1992 | Blair et al. ................. 324/434 |
| 5,178,969 | A | * | 1/1993 | Amemiya .................... 429/26 |
| 5,503,944 | A | | 4/1996 | Meyer et al. |
| 6,024,848 | A | | 2/2000 | Dufner et al. |
| 6,635,370 | B1 | * | 10/2003 | Condit et al. ................ 429/13 |
| 6,835,479 | B1 | * | 12/2004 | Balliet et al. ................ 429/13 |
| 2005/0031917 | A1 | * | 2/2005 | Margiott et al. ............. 429/17 |

* cited by examiner

*Primary Examiner*—Brian J. Sines
(74) *Attorney, Agent, or Firm*—Malcolm J. Chisholm, Jr.

(57) ABSTRACT

The invention is a system (10) and method for determining a gas composition within a fuel cell (12) of a shut down fuel cell power plant. The system (10) includes at least one fuel cell (12), a sensor circuit (86) secured in electrical connection with the fuel cell (12), wherein the circuit (86) includes a power source (88), a voltage-measuring device (90), and a sensor circuit switch (92). The circuit (86) is secured so that the power source (88) may selectively deliver a pre-determined sensing current to the fuel cell (12) for a pre-determined sensing duration. The system (10) selectively admits the reducing fluid into an anode flow field (28) of the cell (12) whenever the sensor circuit (86) senses that a shut down monitoring voltage of the fuel cell (12) is the same as or exceeds a calibrated sensor voltage limit of the fuel cell (12).

10 Claims, 2 Drawing Sheets

SYSTEM FOR DETERMINING A GAS COMPOSITION WITHIN A SHUT DOWN FUEL CELL POWER PLANT AND METHOD OF OPERATION

TECHNICAL FIELD

The present invention relates to fuel cell power plants that are suited for usage in transportation vehicles, portable power plants, or as stationary power plants, and the invention especially relates to determination of reactant concentrations in flow fields of a shut down fuel cell power plant.

BACKGROUND ART

Fuel cell power plants are well known and are commonly used to produce electrical energy from hydrogen containing reducing fluid and process oxidant reactant streams to power electrical apparatus such as power plants and transportation vehicles. In fuel cell power plants of the prior art, it is well known that, when an electrical circuit connected to the fuel cells is disconnected or opened and there is no longer a load across the cell, such as upon and during shut down of the cell, the presence of air on a cathode electrode along with hydrogen fuel remaining on an anode electrode, often cause unacceptable anode and cathode potentials, resulting in oxidation and corrosion of catalyst and catalyst support materials and attendant cell performance degradation.

Efforts have been proposed to return the cathode electrode to a passive, non-oxidative state upon shut down of the fuel cell. For example, it was thought that inert gas needed to be used to purge both the anode flow field and the cathode flow field immediately upon cell shut down to passivate the anode and cathode electrodes so as to minimize or prevent such cell performance degradation. Further, the use of an inert gas purge avoided, on start-up, the possibility of the presence of a flammable mixture of hydrogen and air, which is a safety issue. While the use of 100% inert gas as the purge gas is most common in the prior art, commonly owned U.S. Pat. Nos. 5,013,617 and 5,045,414 describe using 100% nitrogen as the anode side purge gas, and a cathode side purging mixture comprising a very small percentage of oxygen (e.g. less than 1%) with a balance of nitrogen. Both of these patents also discuss the option of connecting a dummy electrical load across the cell during the start of a purging process to lower the cathode potential rapidly to between the acceptable limit of less than 0.2 volts relative to a hydrogen electrode reference.

A solution has been proposed that avoids the costs associated with storing and delivering a separate supply of inert gas to fuel cells. The costs and complexity of such stored inert gases are undesirable especially in automotive applications where compactness and low cost are critical, and where the system must be shut down and started up frequently. That solution includes shutting down a fuel cell power plant by disconnecting a primary electricity using device (hereinafter, a "primary load"), shutting off the air or process oxidant flow, and controlling the fuel flow into the system and the gas flow out of the system in a manner that results in the fuel cell gases coming to equilibrium across the cells, with the fuel flow shut off, at a gas composition (on a dry basis, e.g. excluding water vapor) of at least 0.0001% hydrogen, balance fuel cell inert gas, and maintaining a gas composition of at least 0.0001% hydrogen (by volume), balance fuel cell inert gas, during shut down. Preferably, any nitrogen within the equilibrium gas composition is from air either introduced into the system directly or mixed with the fuel. This method of fuel cell shut down also includes, after disconnecting the primary load and shutting off the air supply to the cathode flow field, continuing to supply fresh fuel to the anode flow field until the remaining oxidant is completely consumed. This oxidant consumption is preferably aided by having a small auxiliary load applied across the cell, which also quickly drives down the electrode potentials. Once all the oxidant is consumed, the fuel feed is stopped, a fuel exit valve is shut, and air is introduced into the anode flow field (if needed) until the hydrogen concentration in the anode flow field is reduced to a selected intermediate concentration level, above the desired final concentration level. Air flow into the anode flow field is then halted, and the fuel cell gases are allowed to come to equilibrium, which will occur through diffusion of gases across the electrolyte and chemical and electrochemical reaction between the hydrogen and the added oxygen.

During continued shut down, a hydrogen concentration is monitored, and hydrogen is added, as and if necessary, to maintain the desired hydrogen concentration level. That shut down method teaches that a desired range of hydrogen concentration is between 0.0001% and 4%, with the balance being fuel cell inert gases. The latter step of adding hydrogen is likely to be required due to leakage or diffusion of air into the fuel cell and/or leakage or diffusion of hydrogen out of the fuel cell, such as through seals. As air leaks into the system, hydrogen reacts with the oxygen in the air and is consumed. The hydrogen needs to be replaced, from time to time, to maintain the hydrogen concentration within the desired range.

These and other known methods of shutting down a fuel cell power plant require intermittent determinations of gas composition within flow fields of the fuel cells of the plant in particular to determine relative concentrations of oxygen and hydrogen. Known apparatus and methods for determination of such gas compositions within fuel cell flow fields adjacent electrodes involve standard gas composition sensors. Known sensors, however, present significant difficulties in maintaining an efficient shut down of a fuel cell power plant. Known sensors are unreliable, especially within the working environment of a fuel cell flow field adjacent electrodes. For usage within a transportation vehicle that is likely to have between 50,000 to 100,000 shut down and start up cycles during a 10-year expected useful life, sensor reliability is a significant issue. Additionally, securing known gas composition sensors within reactant fluid flow fields or a fuel cell stack within a power plant is a significant manufacturing and cost burden, especially where such fuel cell stack assemblies have over two hundred separate fuel cells. Known gas composition sensors could be secured in reactant fluid flow manifolds of a fuel cell power plant to minimize cost and manufacturing problems. However such placement of sensors external to reactant flow fields would require a recycling flow of gases stored within flow fields in order to measure a representative composition of such reactant gases within the fuel cell flow fields. Such recycling flow would require significant auxiliary power to operate blowers, etc., during shut down of the power plant, which would be an additional burden to the plant.

Consequently, there is a need for a fuel cell power plant that includes an efficient system for monitoring a gas composition within reactant flow fields of fuel cells of the plant during shut down of the plant, and for adjusting the gas composition within the flow fields during shut down to maintain a potential of the electrodes of the fuel cell power plant below an open circuit potential limit.

DISCLOSURE OF THE INVENTION

The invention is a system for determining a gas composition within fuel cells of a shut down fuel cell power plant and a method of operation of the system. The system includes at least one fuel cell for generating electrical current from hydrogen containing reducing fluid and process oxidant reactant streams, wherein the fuel cell includes an anode electrode and a cathode electrode on opposed sides of an electrolyte, an anode flow field adjacent the anode electrode for directing the reducing fluid stream to flow adjacent to the anode electrode, a cathode flow field adjacent the cathode electrode for directing the process oxidant stream to flow adjacent the cathode electrode, and an anode inlet valve secured in fluid communication with the anode flow field for selectively admitting the reducing fluid into the anode flow field. The system also includes a sensor circuit secured in electrical connection with the fuel cell, wherein the circuit includes a power source, a voltage-measuring device, and a sensor circuit switch. The circuit is secured so that the power source may selectively deliver a pre-determined sensing current to the cell for a pre-determined sensing duration. A controller is secured in electrical communication with the sensor circuit and the anode inlet valve for selectively admitting the reducing fluid into the anode flow field whenever the sensor circuit senses that a shut down monitoring voltage of the cell is the same as or exceeds a sensor voltage limit of the cell.

The system effectively utilizes the electrodes within the fuel cells as sensors. By applying a specific sensing current for a pre-determined sensing duration to the fuel cell, the cell develops a voltage that is proportional to the gas composition within the reactant flow field adjacent to each electrode. The sensor circuit must first be calibrated to determine a specific sensor voltage output for the fuel cells within a particular fuel cell power plant as a function of gas composition within the power plant.

It has been determined that if an open circuit potential of the electrodes is maintained below 0.2 volts relative to a hydrogen reference electrode, the electrodes do not experience significant oxidative decay. Calibrating the sensor circuit for a particular fuel cell power plant determines a sensor voltage limit for that power plant. The sensor voltage limit for that power plant corresponds to an open circuit voltage for the fuel cell of 0.2 volts. The sensor voltage limit is a voltage that indicates an excessive amount of oxygen is present in the reactant flow fields.

The sensor circuit is calibrated by first establishing a relationship between an open circuit voltage of the cells when the anodes are exposed to a hydrogen gas, or a hydrogen rich gas of known composition (hereafter referred to as an "open circuit hydrogen voltage") and a monitoring voltage of the electrodes when the predetermined sensing current of the sensor circuit is applied to the electrodes for the predetermined sensing duration for a first oxygen concentration within flow fields of a fuel cell. Then, a relationship is established between an open circuit hydrogen voltage and monitoring voltage of the electrodes for a second oxygen concentration within the fuel cell flow fields. The correlation of the data from determination of the open circuit hydrogen voltages and monitoring voltages for the two oxygen concentrations is utilized to determine the sensor voltage limit. The relationship between open circuit hydrogen voltages and monitoring voltages for varying reactant concentrations within a fuel cell power plant may be established, for example, by plotting the voltages as data points on a graph such as shown in FIG. 2 to define a line, from which the sensor voltage limit for the fuel cell power plant can be extrapolated.

During shut down of the fuel cell power plant, the sensor circuit may simply be utilized to intermittently apply the predetermined sensor current to the fuel cell electrodes for the predetermined sensing duration. If the resulting voltage just prior to the expiration of the sensing duration (hereinafter referred to as the "shut down monitoring voltage") is the same as or exceeds the sensor voltage limit, then the sensor circuit has sensed that there is too much oxygen in the fuel cell flow fields, and hydrogen may be admitted to consume the oxygen. Additionally, the system may be utilized to test a particular fuel cell, or fuel cells of a power plant in order to determine how long the fuel cell or cells of the plant may maintain their flow fields below a harmful oxygen concentration during shut down of the plant. That information will assist in evaluating a useful life of the fuel cell power plant based upon a number of anticipated shut down and start up cycles, upon quality of seals restricting oxygen entry, etc., if the plant is not equipped with a mechanism for replenishing the flow fields with hydrogen during shut down of the plant.

Accordingly, it is a general purpose of the present invention to provide a system for determining a gas composition within a shut down fuel cell power plant and method of operation of the system that overcomes deficiencies of the prior art.

It is a more specific purpose to provide a system and method for determining a gas composition within a shut down fuel cell power plant that does not have to utilize gas composition sensors within the fuel cell power plant.

It is yet another purpose to provide a system and method for determining a gas composition within a shut down fuel cell power plant that utilizes electrodes of fuel cells of the plant as sensors for determining a gas composition.

It is another purpose to provide a system and method for determining a gas composition within a shut down fuel cell power plant that provides information on an ability of the plant to contain hydrogen while shut down.

These and other purposes and advantages of the present system and method of determining a gas composition within a shut down fuel cell power plant will become more readily apparent when the following description is read in conjunction with the accompanying drawing.

DESCRIPTION OF THE PREFERRED EMBODIMENTS

Figure 1:
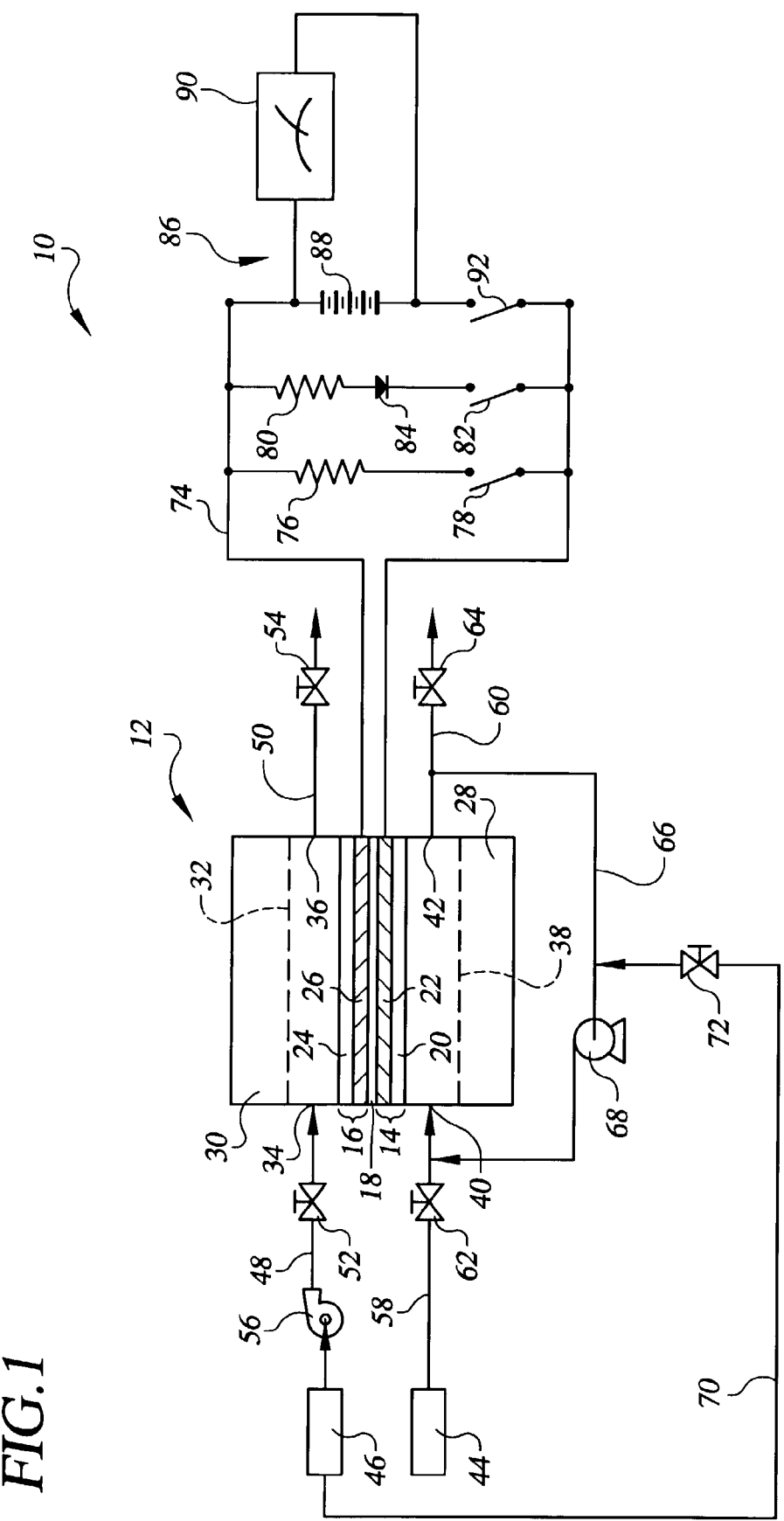
FIG. 1 is a schematic representation of a preferred embodiment of a system for determining a gas composition within a shut down fuel cell power plant constructed in accordance with the present invention.

Referring to the drawings in detail, a first embodiment of a system for determining a gas composition within a shut down fuel cell power plant is shown in FIG. 1, and is generally designated by the reference numeral 10. The system includes a fuel cell 12 having an anode 14 (which may also be referred to herein as an anode electrode), a cathode 16 (which may also be referred to as a cathode electrode), and an electrolyte 18 disposed between the anode and cathode. The electrolyte 18 may be in the form of a proton exchange membrane (PEM) of the type described in U.S. Pat. No. 6,024,848, or the electrolyte may be held within a ceramic matrix, such as is typically found in acid aqueous electrolyte fuel cells, such as phosphoric acid electrolyte fuel cells.

The anode electrode 14 includes an anode substrate 20 having an anode catalyst layer 22 disposed thereon on the side of the substrate 20 facing the electrolyte 18. The cathode electrode 16 includes a cathode substrate 24, having a cathode catalyst layer 26 disposed thereon on the side of the substrate facing the electrolyte 18. The cell also includes an anode flow field 28 adjacent the anode substrate 20 and a cathode flow field 30 adjacent the cathode substrate 24. The cathode flow field 30 defines a plurality of channels 32 extending through the cathode flow field 30 for carrying an oxidant, preferably air, across the cathode from a cathode inlet 34 to a cathode outlet 36. Similarly, the anode flow field 28 defines a plurality of channels 38 extending through the anode flow field 28 for carrying a hydrogen containing reducing fluid or fuel across the anode electrode 14 from an anode inlet 40 to an anode outlet 42. The anode flow field 28 and the cathode flow field 30 include pores, channels, or voids defined within the anode and cathode flow fields 28, 30 to direct the reactant streams passing through the fields 28, 30 to pass adjacent to and in contact with the anode electrode 14 or cathode electrode 16.

Although only a single cell 12 is shown, in actuality a fuel cell power plant would comprise a plurality of adjacent cells (i.e. a stack of cells) connected electrically in series, each having a cooler plate and/or separator plate (not shown) separating the cathode flow field of one cell from an anode flow field of the adjacent cell. For more detailed information regarding fuel cells like the one represented in FIG. 1, the reader is directed to commonly owned U.S. Pat. Nos. 5,503,944 and 4,115,627, both of which are incorporated herein by reference. The '944 patent describes a solid polymer electrolyte fuel cell wherein the electrolyte is a proton exchange membrane (PEM). The '627 patent describes a phosphoric acid electrolyte fuel cell wherein the electrolyte is a liquid held within a porous silicon carbide matrix layer. The present invention is particularly well suited for use with PEM cells; but it may also be used with phosphoric acid cells or other known electrolytes.

As shown in FIG. 1, the fuel cell system includes hydrogen containing reducing fluid fuel source 44 and a process oxidant source 46, such as air. The fuel may be pure hydrogen or other hydrogen rich fuel, such as reformed natural gas or gasoline. A cathode inlet line 48 carries air from the source 46 into the cathode flow field inlet 34; and a cathode exhaust line 50 carries spent air away from the cathode outlet 36. A cathode inlet valve 52 is secured to the cathode inlet line 48, and a cathode outlet valve 54 is secured to the cathode exhaust line 50 for permitting and terminating flow of the process oxidant or air through the cathode flow field 30. A blower 56 may be secured to the cathode inlet line 60 to increase a pressure of the process oxidant stream passing through the cathode flow field 30.

An anode inlet line 58 is secured in fluid communication between the fuel source 44 and the anode flow field 28, and an anode exhaust line 60 directs the reducing fluid fuel stream out of the anode flow field 28. An anode inlet valve 62 is secured to the anode inlet line 58, and an anode exhaust valve 64 is secured to the anode exhaust line 60, for permitting or terminating flow of the hydrogen containing reducing fluid fuel through the anode flow field 28.

An anode recycle line 66 may be secured in fluid communication with the anode outlet 42 and the anode inlet 40, so that the anode recycle line 66 is secured between the anode outlet 42 and the anode exhaust valve 64, and between the anode inlet 40 and the anode inlet valve 62. The anode recycle line 66 includes an anode recycle pump or blower 68 for moving a portion of the anode exhaust stream within the anode exhaust line 60 through the anode recycle line 66 and into the anode inlet 40 back into the anode flow field 28. An oxidant feed line 70 is secured to the anode recycle line 66 to permit inflow of an oxidant to the recycle line 66, and the oxidant feed line 70 may be secured in fluid communication with the oxidant supply 46, or may simply be open to ambient air. An fuel vacuum break valve 72 is secured to the oxidant feed line 70 to permit or terminate passage of the oxidant into the anode recycle line 66. Additionally, the fuel vacuum break valve 72 may also serve to prohibit flow of the anode exhaust stream or any oxidant out of the anode recycle line 66.

The system for determining a gas composition of a fuel cell power plant 10 also includes an external circuit 74 connecting the anode electrode 14 and cathode electrode 16. The external circuit 74 includes a primary load 76 connected to the external circuit 74 through a primary load switch 78. The external circuit may also include an auxiliary resistive load 80 connected to the external circuit through an auxiliary load switch 82, and the auxiliary load 80 may also include a diode 84 in series with the auxiliary resistive load 80.

A sensor circuit 86 is also secured in electrical communication with electrodes 14, 16 of the cell 12, such as through the external circuit 74. The sensor circuit 86 includes a direct current power source 88 such as a D.C. conventional, regulated power supply, battery-type of power source; a voltage-measuring device means for measuring the voltage in the sensor circuit, such as a standard voltmeter 90; and a sensor circuit switch 92.

During normal operation of the fuel cell power plant 10, the primary load switch 78 is closed (it is shown open in FIG. 1); the auxiliary load switch 82 is open, so that the fuel cell power plant is providing electricity to the primary load 76, such as an electric motor, etc.; and the sensor circuit switch 92 is open, so that the sensor circuit is not directing any electrical current to the anode and cathode electrodes 14, 16. The oxidant blower 56, and the anode exhaust recycle blower 68 are on. The cathode inlet and outlet valves 52 and 54 are open, as are the anode inlet 62 and anode exhaust valves 64. The fuel vacuum break valve 72 is closed so that no air flows into the anode flow field 28 via the anode recycle line 66.

Therefore, during normal operation of the plant 10, process oxidant such as air from the oxidant source 46 is continuously delivered into the cathode flow field 30 inlet through the cathode inlet line 48, and leaves the cathode flow field 30 through the cathode exhaust line 50. The hydrogen containing reducing fluid fuel from the fuel source 44 is continuously delivered into the anode flow field 28 through the anode inlet line 58. A portion of the anode exhaust, containing depleted hydrogen fuel, leaves the anode flow field 28 through the anode exhaust line 60 and the anode exhaust valve 64, while the anode recycle line 66 and recycle blower 68 re-circulates the balance of the anode exhaust through the anode flow field 28 in a manner well know in the prior art. Recycling a portion of the anode exhaust helps maintain a relatively uniform gas composition from the anode inlet 40 to the anode outlet 42 of the anode flow field 28, and permits increased hydrogen utilization. As the hydrogen passes through the anode flow field, it electrochemically reacts on the anode catalyst layer 22 in a well-known manner to produce protons (hydrogen ions) and electrons. The electrons flow from the anode electrode 14 to the cathode electrode 16 through the external circuit 74 to power the primary load 76.

Shutting down the operating fuel cell power plant 10 includes opening or disconnecting the primary load switch 78 (as shown in FIG. 1) in the external circuit 74 to disconnect the primary load 76. The anode inlet or fuel flow valve 62 remains open; and the anode exhaust recycle blower 68 remains on to continue recirculation of a portion of the anode exhaust. However, the anode exhaust vent valve 64 will remain open or be closed depending upon the percent hydrogen in the incoming fuel and the relative volumes of the anode and cathode sides of the fuel cell. The flow of fresh air to the cathode flow field 30 is turned off by closing the cathode inlet and cathode outlet valves 52, 54. The cathode inlet blower 56 is also shut off. The auxiliary load 80 may then be connected to the external circuit by closing the auxiliary load switch 82. With current flowing through the auxiliary load 80, typical electrochemical cell reactions occur, causing the oxygen concentration in the cathode flow field 30 to be reduced and cell voltage to be lowered.

The application of the auxiliary load 80 is initiated while there is still sufficient hydrogen within the fuel cell 12 to electrochemically react all the oxygen remaining within the fuel cell 12. It preferably remains connected at least until the cell voltage is lowered to a pre-selected value, preferably 0.2 volts per cell or less. The diode 84, connected across the cathode and anode 14, 16, senses the cell voltage and allows current to pass through the auxiliary load 80 as long as the cell voltage is above the pre-selected value. In that way, the fuel cell 12 voltage is reduced to and thereafter limited to the pre-selected value. When the cell voltage drops to 0.2 volts per cell, substantially all the oxygen within the cathode flow field 30, and any that has diffused across the electrolyte 18 to the anode flow field 28, will have been consumed. The auxiliary load 80 is then disconnected by opening the auxiliary load switch 82.

During shut down of the plant 10, oxygen from the air may leak into the flow fields 28, 30 so that the potential of the anode and cathode electrodes 14, 16 will eventually ascend above 0.2 volts relative to a hydrogen reference electrode, leading to oxidative decay within the fuel cell 12. Hydrogen gas from the reducing fluid source 44 may then be admitted prior to the electrode potential reaching 0.2 volts in order to consume the oxygen, thereby minimizing any oxidative decay. The hydrogen may be circulated throughout the anode flow field 28 by opening the anode inlet valve 62 and turning on the anode recycle blower 68 while the anode exhaust vent valve 64 remains closed. Any such admitted hydrogen will also diffuse through the electrolyte 18 to consume oxygen in the cathode flow field 30.

The sensor circuit 86 may be utilized to determine when it is appropriate to admit hydrogen into the fuel cell 12 by closing the sensor circuit switch 92 to apply a predetermined sensing current to the electrodes 14, 16 for a predetermined sensing duration. Immediately prior to expiration of the sensing duration, the cell voltage is determined by the voltage measuring device 90, which voltage is characterized herein as the "shut down monitoring voltage". If the shut down monitoring voltage is the same as or exceeds a sensor voltage limit for the fuel cells receiving the sensing current, then hydrogen or a hydrogen rich gas may be admitted to the fuel cell 12 flow fields 28, 30, as described above, or by any method known in the art.

The sensor circuit 86 may also be in communication with a hydrogen admitting controller means (not shown) for controlling admission of the hydrogen fuel into the fuel cell 12 flow fields 28, 30. The controller means may be any controller known in the art that can accomplish the task of admitting hydrogen into the flow fields 28, 30 upon detection by the sensor circuit 86 of a shut down monitoring voltage at about or exceeding the sensor voltage limit. Exemplary controller means include simple manual opening by a power plant operator (not shown) of the anode inlet valve 62, or any other mechanism capable of admitting hydrogen into the fuel cell flow fields and starting of the anode exhaust recycle blower 68 by the operator or a control system. Other controller means could include electro-mechanical controls integrating the voltage measuring device with the anode inlet valve 62, as well as with the anode recycle blower 68, such as are known in the art for opening valves and blowers, etc., in response to sensor signals.

The sensor circuit 86 must be calibrated for use with a particular fuel cell power plant in order to determine the sensor voltage limit for that power plant. Calibrating the sensor circuit 86 is accomplished by establishing a relationship between an open circuit voltage of the cells of the plant when electrodes of the cells are exposed to 100% hydrogen gas (herein referred to as an "open circuit hydrogen voltage") and a monitoring voltage of the electrodes when the predetermined sensing current of the sensor circuit is applied to the electrodes for the predetermined sensing duration for a first reactant concentration within flow fields of a fuel cell. Then, a relationship is established between an open circuit hydrogen voltage and monitoring voltage of the electrodes for a second reactant concentration within the fuel cell flow fields.

Figure 2:
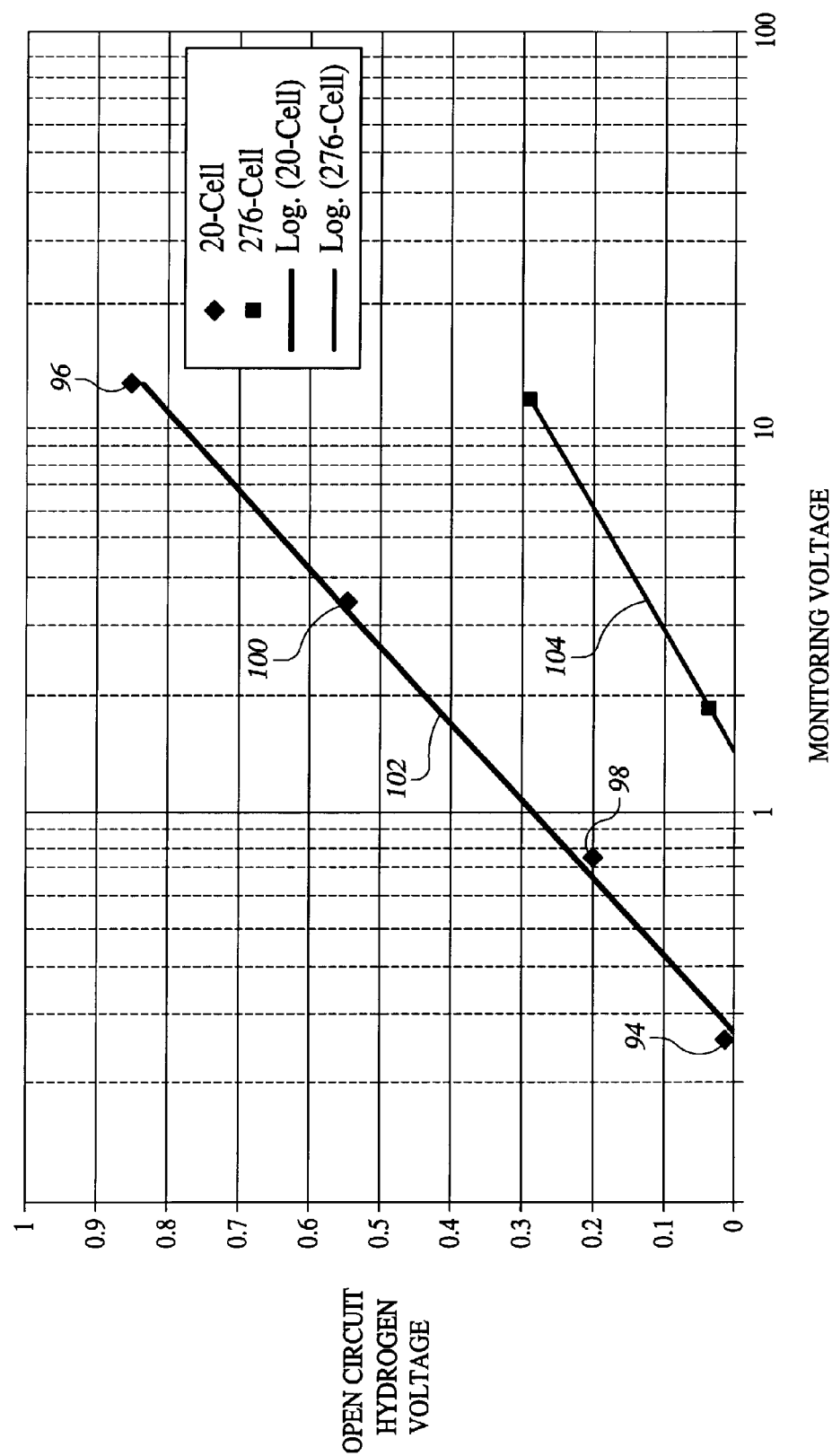
FIG. 2 is a graph showing plots of open circuit hydrogen voltage data and monitoring voltage data for varying oxygen gas compositions with 20 and 276 cell fuel cell stack assemblies.

An exemplary calibration of a sensor circuit included the following procedures. A 20-cell fuel cell stack was fabricated using a proton exchange membrane ("PEM") anode and cathode electrode assembly available from W.L. Gore Company of Elkton, Md., U.S.A. under the product name "Gore 5561". The stack was stored at room temperature with a first initial gas composition within the fuel cell, and with a resistive auxiliary load, such as the auxiliary load 80 above, connected so that the voltage across the cells was 0.0 volts. The auxiliary load was disconnected, and a sensor circuit delivered a sensing current of 100 milliamps ("mA") across the cells for a sensing duration of 5 seconds. At the expiration of the sensing duration, with the current connected, a monitoring voltage of 0.25 millivolts ("mV") was measured. Then, the sensor circuit was disconnected, and 100% hydrogen was introduced into the anode flow field, and the open circuit hydrogen voltage was measured as 0.01 volts. FIG. 2 shows a plot of a correlation of those two data points on a graph at reference numeral 94. One skilled in the art can deduce that the gas composition within the cell at the time the sensing current of 100 mA was applied was essentially pure hydrogen.

The same procedure was repeated for a second gas composition, or second reactant concentration within the fuel cells. A monitoring voltage of 14 mV was measured, and an open circuit hydrogen voltage of 0.85 volts was measured. The correlation of these data points is shown in FIG. 2 at reference numeral 96. One skilled in the art can deduce that the gas composition within the fuel cell at the time the sensing current of 100 mA was applied was between 5%–20% oxygen. An additional test for a third gas composition measured a monitoring voltage of about 0.75 mV and corresponding open circuit hydrogen voltage of about 0.2 volts, as plotted at reference numeral 98. Another test for a fourth gas composition measured a monitoring voltage of about 3.5 mV and a corresponding open circuit hydrogen voltage of about 0.55 volts, which is plotted in FIG. 2 at reference numeral 100. As is apparent from the FIG. 2 graph, those four data points at reference numerals 94, 96, 98, 100 define a line 102.

The line 102 serves as a basis for determining a sensor voltage limit corresponding to an open circuit voltage of 0.2 volts, which corresponds on the line 102 to a monitoring voltage of about 0.7 mV. In other words, whenever the sensor circuit for this first exemplary 20-cell fuel cell stack delivers a sensing current of 100 mA for a sensing duration of 5 seconds, to minimize oxidative decay, the resulting shut down monitoring voltage must be below 0.7 mV. If the shut down monitoring voltage is about or above 0.7 mV for this fuel cell power plant, then hydrogen may be admitted to the fuel cell flow fields to consume the excess oxygen. Additionally, the use of the sensor circuit through intermittent testing on the exemplary fuel cell may reveal a time period the exemplary 20-cell fuel cell stack can maintain a shut down, open circuit potential below the sensor voltage limit. That would provide valuable information on a useful life of the fuel cell power plant utilizing that 20-cell fuel cell stack in the event the plant is not to have a capacity of replenishing the fuel cell flow fields with hydrogen during a shut down period.

As shown in FIG. 2, a sensor circuit was also calibrated for a second exemplary fuel cell stack having 276 fuel cells. Examination of the data defined a line shown at reference numeral 104 for the 276-cell stack, and the line 104 produces a sensor voltage limit for the 276-cell stack of about 6 mV.

It is believed that the differences in open circuit hydrogen voltages relative to the monitoring voltages for different oxygen gas compositions is a result of hydrogen evolution-consumption (oxidation-reduction) reactions being much more reversible (i.e., occur with much lower over potential) than the corresponding oxygen oxidation-reduction reactions, as is known in the art.

An alternative procedure for calibrating a sensor circuit for a particular fuel cell includes passing a hydrogen containing gas having a known hydrogen composition of 4%–100% through both the anode and cathode flow fields. The predetermined sensor current is then applied for the predetermined sensor duration and the monitoring voltage across the cells is measured just prior to the expiration of the sensor duration. A gas stream consisting of 100% hydrogen is passed through the anode flow field immediately after the sensor current is disconnected to produce the open circuit hydrogen voltage. This procedure is repeated with an oxygen containing gas with a known composition of 4%–21% oxygen, which is passed through both the anode and cathode flow fields. A monitoring voltage is determined as described above, and then 100% hydrogen is passed through the anode flow field to determine an open circuit hydrogen voltage for the second oxygen composition. A relationship between the open circuit hydrogen voltages and the monitoring voltages for the two oxygen compositions is then established, such as by plotting the measurements as data on a graph like FIG. 2. A determination from the relationship can then be made to identify the sensor circuit limit for the particular fuel cell or fuel cells tested by the alternative procedure.

The system and method for determining a gas composition within a shut down fuel cell power plant 10 of the present invention therefore provides for efficiently monitoring an amount of oxygen within fuel cell flow fields 28, 30 during shut down in order to minimize oxidative corrosion and fuel cell performance degradation resulting from known systems and methods for shutting down fuel cells. By utilizing the cathode and anode electrodes 14, 16 of the fuel cell as effective sensors for the sensor circuit 86, the gas composition determination can be intermittently monitored without any need for use of complex and costly sensors within the fuel cell flow fields 28, 30 or manifolding. In use of the sensor voltage limit in monitoring the gas composition within the fuel cell flow fields 28, 30 during shut down and in admitting hydrogen into the flow fields 28, 30 whenever the shut down monitoring voltage is about the same as, or exceeds the sensor voltage limit, the system and method of the present invention will minimize any oxidative decay and performance degradation of the fuel cell power plant 10.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A system for determining a gas composition within a fuel cell 12 of a shut down fuel cell power plant, the system comprising;
   a. at least one fuel cell 12 for generating electrical current from hydrogen containing reducing fluid and process oxidant reactant streams, wherein the fuel cell includes an anode electrode 14 and a cathode electrode 16 on opposed sides of an electrolyte 18, an anode flow field 28 adjacent the anode electrode 14 for directing the reducing fluid stream to flow adjacent to the anode electrode 14, a cathode flow field 30 adjacent the cathode electrode 16 for directing the process oxidant stream to flow adjacent the cathode electrode 16, and an anode inlet valve 62 secured in fluid communication with the anode flow field 28 for selectively admitting the reducing fluid into the anode flow field 28; and,
   b. a sensor circuit 86 secured in electrical connection with the fuel cell 12, wherein the circuit 86 includes a power source 88, a voltage-measuring device 90, and a sensor circuit switch 92, the sensor circuit 86 being secured to the fuel cell 12 so that the power source 88 may selectively deliver a pre-determined sensing current to the fuel cell 12 for a pre-determined sensing duration.

2. The system for determining a gas composition within a fuel cell 12 of a shut down fuel cell power plant of claim 1, further comprising a hydrogen admitting controller means secured in electrical communication with the sensor circuit 86 and the anode inlet valve 62 for selectively admitting the hydrogen containing reducing fluid into the anode flow field 28 whenever the sensor circuit 86 senses that a shut down monitoring voltage of the fuel cell 12 is about the same as or exceeds a sensor voltage limit of the fuel cell 12 power plant.

3. The system for determining a gas composition within a fuel cell 12 of a shut down fuel cell power plant of claim 2, further comprising an anode recycle line 66 secured in fluid communication between an anode outlet 42 and an anode inlet 40, and an anode recycle blower 68 secured to the anode recycle line 66 for directing at least a portion of an anode exhaust stream from the anode outlet 42 to the anode inlet 40.

4. A method for determining a gas composition of a fuel cell 12 of a shut down fuel cell power plant, the fuel cell power plant including at least one fuel cell 12 for generating electrical current train hydrogen containing reducing fluid and process oxidant reactant streams, wherein the fuel cell 12 includes an anode electrode 14 and a cathode electrode 16 on opposed sides of an electrolyte 18, an anode flow field 28 adjacent the anode electrode 14 tar directing the reducing fluid stream, to flow adjacent to the anode electrode 14, a cathode flow field 30 adjacent the cathode electrode 16 for directing the process oxidant stream to flow adjacent the cathode electrode 16, the method comprising the steps of:

a. securing a sensor circuit 86 having a power source 88 and a voltage measuring device 90 in electrical communication with the fuel cell 12 so that the power source may selectively deliver a predetermined sensing current to the fuel cell 12 for a predetermined sensing duration;

b. calibrating the sensor circuit 86 to determine a sensor voltage limit of the shut down fuel cell 12 power plant by the steps of;

i. determining open circuit hydrogen voltages of the fuel cell 12 when the anode electrode 14 is exposed to hydrogen gas, and determining monitoring voltages of the cell 12 when the predetermined sensing current of the sensor circuit 86 is applied to the fuel cell 12 for a predetermined sensing duration for a first reactant concentration and for a second reactant concentration within the fuel cell 12; and, ii. calculating the sensor voltage limit from the open circuit hydrogen voltages and the monitoring voltages for the first and second reactant concentrations within the fuel cell 12.

5. The method for determining a gas composition of a shut down fuel cell 12 power plant of claim 4, comprising the further step of intermittently applying the predetermined sensing current to the fuel cell 12 for the predetermined sensing duration, and then admitting hydrogen into the fuel cell flow fields 28, 30 whenever a shut down monitoring voltage is about the same as or exceeds the sensor voltage limit.

6. The method for determining a gas composition of a shut down fuel cell 12 power plant of claim 5 comprising the further step of admitting the hydrogen through an anode inlet valve 62 secured in fluid communication between a storage source 44 of the hydrogen reducing fluid and an anode inlet 40 of the fuel cell 12.

7. The method for determining a gas composition of a shut down fuel cell 12 power plant of claim 6, comprising the further step of operating an anode recycling blower 68 secured to an anode recycling line 66 whenever hydrogen is admitted to the fuel cell 12 to uniformly distribute the admitted hydrogen throughout the anode flow field 28.

8. A method for determining a gas composition of a shut down fuel cell 12 power plant, the fuel cell power plant including at least one fuel cell 12 for generating electrical current from hydrogen containing reducing fluid and process oxidant reactant streams, wherein the fuel cell 12 includes an anode electrode 14 and a cathode electrode 16 on opposed sides of an electrolyte 18, an anode flow field 28 adjacent the anode electrode 14 for directing the reducing fluid stream to flow adjacent to the anode electrode 14, a cathode flow field 30 adjacent the cathode electrode 16 for directing the process oxidant stream to flow adjacent the cathode electrode 16, the method comprising the steps of:

a. securing a sensor circuit 86 having a power source 88 and a voltage measuring device 90 in electrical communication with the fuel cell 12 so that the power source 88 may selectively deliver a predetermined sensing current to the fuel cell 12 for a predetermined sensing duration;

b. calibrating the sensor circuit 86 to determine a sensor voltage limit of the shut down fuel cell power plant by the steps of;

i. determining a first monitoring voltage and a first open circuit hydrogen voltage across the fuel cell 12 for a first reactant concentration within the fuel cell 12 by connecting the sensor circuit 86 power source 88 to the electrodes 14, 16 to deliver to the electrodes 14, 16 the pre-determined sensing current for the pre-determined sensing duration, then measuring with the voltage-measuring device 90 the first monitoring voltage across the electrodes 14, 16 immediately prior to expiration of the sensor duration, then admitting hydrogen into the anode flow field 28 and then measuring with the voltage-measuring device 90 the first open circuit hydrogen voltage across the electrodes 14, 16;

ii. determining a second monitoring voltage and a second open circuit hydrogen voltage across the fuel cell 12 for a second reactant concentration within the fuel cell, which second reactant concentration is different than the first reactant concentration, by connecting the sensor circuit 86 power source 88 to the electrodes 14, 16 to deliver to the electrodes 14, 16 the pre-deterinined sensing current for the pre-determined sensing duration, then measuring with the voltage-measuring device 90 the second monitoring voltage across the electrodes 14, 16 immediately prior to expiration of the sensor duration, then admitting hydrogen into the anode flow field 28 and then measuring with the voltage-measuring device 90 the second open circuit hydrogen voltage across the electrodes 14, 16; and, iii. then correlating the first monitoring voltage and the first open circuit hydrogen voltage with the second monitoring voltage and the second open circuit hydrogen voltage to determine the sensor voltage limit of the shut down fuel cell power plant.

9. The method for determining a gas composition of a shut down fuel cell power plant of claim 8, comprising the further step of intermittently applying the predetermined sensing current to the fuel cell 12 for the predetermined sensing duration, and then admitting hydrogen into the fuel cell 12 flow fields 28, 30 whenever a shut down monitoring voltage detected by the sensor circuit 86 is about the same as or exceeds the sensor voltage limit.

10. The method for determining a gas composition of a shut down fuel cell power plant of claim 9 comprising the further step of admitting the hydrogen through an anode inlet valve 62 secured in fluid communication between a storage source 44 of the hydrogen reducing fluid and an anode inlet 40 of the fuel cell.

\* \* \* \* \*